United States Patent [19]

Chatzipetros et al.

[11] Patent Number: 4,668,261
[45] Date of Patent: May 26, 1987

[54] APPARATUS FOR THE SEPARATION OF A GAS COMPONENT FROM A GAS MIXTURE BY FREEZEOUT

[75] Inventors: Johann Chatzipetros, Frechen; Helmut Hackfort, Cologne, both of Fed. Rep. of Germany

[73] Assignee: Kernforschungsanlage Julich GmbH, Julich, Fed. Rep. of Germany

[21] Appl. No.: 745,645

[22] Filed: Jun. 17, 1985

[30] Foreign Application Priority Data

Jun. 16, 1984 [DE] Fed. Rep. of Germany ....... 3422417

[51] Int. Cl.$^4$ ............................................. F25J 3/06
[52] U.S. Cl. ............................................. 62/37; 62/12; 62/21; 62/22; 62/55.5; 62/40
[58] Field of Search ............ 62/10, 12, 18, 22, 21, 62/37, 55.5, 540, 40, 42, 44; 165/155, 156, 161, 163

[56] References Cited

U.S. PATENT DOCUMENTS

| 2,999,365 | 9/1961 | Jonkers | 62/12 |
|---|---|---|---|
| 3,606,761 | 9/1971 | Muenger et al. | 62/12 |
| 4,207,746 | 6/1980 | McFarlin | 62/55.5 |
| 4,506,513 | 3/1985 | Max | 62/55.5 |
| 4,546,613 | 10/1985 | Eacobacci et al. | 62/55.5 |

Primary Examiner—S. Leon Bashore
Assistant Examiner—Andrew J. Anderson
Attorney, Agent, or Firm—Karl F. Ross; Herbert Dubno

[57] ABSTRACT

A cold trap for the removal of a component from a gas mixture includes a cooling coil, made up of cooling sections of highly thermally conductive material and intermediate sections of low thermal conductivity, and a heating coil arranged for controlling the inlet temperature to equal the saturation temperature of that component in the gas mixture, its outlet temperature to equal the saturation temperature at a desired residual concentration of the component in the mixture and the temperature of cooling surfaces between the inlet and the outlet at a temperature which substantially falls linearly from the inlet temperature to the outlet temperature. The cooling surfaces extend generally perpendicular to the principal gas flow direction and the residence time of the gas is comparatively large so that the gas is practically at the temperature of the cooling surfaces at all times and nucleation in the gas spaces which might lead to obstruction of the flow passages is precluded.

9 Claims, 5 Drawing Figures

APPARATUS FOR THE SEPARATION OF A GAS COMPONENT FROM A GAS MIXTURE BY FREEZEOUT

FIELD OF THE INVENTION

Our present invention relates to a method of and to an apparatus for the removal of a gas component from a gas stream by a change-of-state process utilizing cooling of the gas component to a point at which the component deposits upon a surface, generally in a process involving freezing and/or condensation.

More particularly the invention relates to the sublimation or freezeout of a gas component of a gas mixture on a cool condensation surface in a low-temperature trap for that component.

BACKGROUND OF THE INVENTION

The separation of gas components from gas mixtures by a freezeout, sublimation or combined condensation and freezing process is, of course, known and is the principle with which, for example, cryogenic (liquid-air) traps operate. The freezeout process has been used, for example, to separate xenon from nitrogen in cold traps at cryogenic temperatures, the gas mixture being passed through an annular or tubular duct which is cooled and which can be provided with longitudinal ribs extending in the direction of movement of the gas through the duct. However with conventional traps of this type, there is a tendency toward the development of frost, snow or the like in the gas as the temperature drops below the saturation temperature of the xenon in the gas mixture and some danger that the flow cross section will be plugged or reduced by the precipitate spontaneously formed in the gas.

In general, the cryogenic traps of this type can operate only for some limited length of time without significant obstruction of the gas flow and, as a consequence, the separating efficiency fluctuates fairly significantly. As a result operation of such traps is less than optimal.

Another important problem with traps which may be subject to fluctuation in operation efficiency is that it is not possible generally to establish reliably a given final concentration of the component which is to be separated from the gas mixture so that one can be certain that even with continued operation for prolonged periods the product emerging from the trap will have this concentration.

OBJECTS OF THE INVENTION

It is the principal object of the present invention to provide a method of removing a gas component from a gas mixture by a freezing-out process whereby disadvantages of earlier processes and apparatus for this purpose can be obviated.

It is also an object of this invention to provide an apparatus for trapping of a gas component at cryogenic temperatures from a gas mixture in which the advantages of the improved method are attained.

Yet another object of this invention is to provide a method of and an apparatus for the freezing-out of a component of a gas mixture so that the trap can operate for especially long periods of time, and, moreover it is possible to operate with a reliable given output concentration of this component in the outflowing gas mixture.

SUMMARY OF THE INVENTION

These objects and others which will become apparent hereinafter are attained, in accordance with the invention, by passing the gas mixture through a trap having an inlet side for the gas mixture and an outlet side, the gas mixture moving in a general flow direction from said inlet to said outlet within the trap.

According to the invention, within the trap between the inlet and the outlet, the gas mixture is passed along cooling surfaces which extend generally perpendicularly to this direction and which are cooled to cryogenic temperatures so that the gas component is condensed and/or frozen out on these surfaces.

According to an essential feature of the invention, the temperature of the surfaces is controlled so that at a gas inlet the saturation temperature of the gas component in the incoming gas mixture prevails, at the outlet the saturation temperature of the gas component in the outflowing gas mixture at the desired final concentration of this gas component prevails, and between the inlet and the outlet in the path of flow of the gas temperature, the surfaces have a substantially linear or weakly parabolic temperature distribution between the inlet and outlet temperatures and the residence time is such that the gas temperature will substantially correspond to the cooling surface temperature.

Under these conditions with a corresponding velocity of the gas mixture and hence the residence time of the gas mixture (or the residence time distribution along the surfaces) between the inlet and the outlet stage the spontaneous nucleation in the gas spaces adjoining these surfaces is precluded. Without such nucleation, ice and frost formation in the gas space does not occur and thus there is no fear that condensed component in form of a difficulty separable aerosol could be driven out of the cooling trap.

According to a feature of the invention, the surfaces are formed by cooling plates, sheets or ribs lying perpendicular to the general direction of flow from the inlet to the outlet so that there is an intensive heat exchange between the cooling surface and the gas and thus a rapid or intensive precipitation of the gas component which is to be frozen out from the gas mixture on the cooled surfaces. When such plates project from alternate sides across the general direction of flow, a meandering path is imparted to the gas mixture along the plates.

The intensive heat exchange precludes any significant temperature difference between the gas and the cooling surface which might promote nucleation in the gas.

If the residence time within the cooling stretch between the inlet and the outlet is additionally increased by this meandering direction of the gas mixture, i.e. by the repeated turning of the gas flow to one side and then to an opposite side on its path from the inlet to the outlet, any temperature difference between the gas and the surface is further suppressed and the transport of the gas component to be frozen out of the mixture to the cooling surface is rendered highly efficient.

We have found that it is advantageous to provide a mean flowing velocity, calculated from the throughput which should not exceed 1.2 m/s and which most preferably should be about 0.12 m/s.

For the intensive heat exchange of the present invention, we have also found it to be advantageous to provide a cooling surface area which is some 50 to 100 times greater than the minimal surface area calculated to effect the desired degree of freezing out of the component from the gas mixture. This underscores the importance of circulating the gas mixture back and forth around interdigitated plates, preferably together with acceleration and deceleration of the gas flow at numerous locations along the flow path, the acceleration and deceleration being effected by flow across section changes along the path, but naturally, such reduced flow cross sections are avoided that would result in an obstruction.

The plates or sheets can be annular plates of different diameters which can alternate with one another or can be annular plates which are cut away alternately at opposite sides, or which are alternately offset to opposite sides in eccentric orientations.

The temperature of the freezeout stretch is monitored and/or controlled by regulation of the coolant flow and/or by additional heating to maintain the above-mentioned saturation temperature at the inlet, saturation temperature at the outlet and the approximately linear temperature distribution along the surfaces between the inlet and the outlet.

The cooling of the surfaces, which preferably are composed of highly thermally conductive material such as copper is advantageously effected by tubes traversed by a coolant and which may be soldered or otherwise brought into heat-transferring relationship to these plates. The tubes preferably are composed of copper.

These highly thermally conductive tubes are repeatingly interrupted by tubes composed of low conductivity materials, e.g. stainless steel, thus dividing the cooling stretch into several successive separate cooling sections (with separate temperature control).

The copper tubing is preferably of square cross section and the turns of the copper tubing can be soldered to each other and to the plate.

Each section may also be provided with respective heating coils or tubing turns which can be traversed by a heating agent so that the temperature of the cooling surfaces of each section can be measured and the requisite temperature distribution maintained by either controlling the heating power or by controlling cooling fluid flow or both.

The trap preferably has a concentric or coaxial construction with a preliminary cooling stretch extending generally in the axial direction without fine regulation and communicating with the main cooling stretch at which the component is frozen out of the mixture and which is provided with fine control of the cooling operation.

The main features of the invention are:
(a) a large cooling area prevailingly by surfaces extending perpendicular to the general gas flow direction;
(b) a temperature distribution across the cooling trap as defined;
(c) a relatively slow gas flow to ensure intense heat exchange;
(d) a continuous revolution of the slowly flowing gas by deflection and optionally successive acceleration and retardation in a passage of changing cross section;
(e) ensuring a minimum temperature difference between gas and cooling surfaces by a, c, d;
(f) inhibiting spontaneous condensation or freezing out of the removable component in the gas space and thus suppressing the formation of aerosols which latter could result in an undesired outflow of unseparated component out of the cooling trap; and
(g) a large cross section of the gas passage preventing any obstruction.

The inventive arrangement of the cooling surfaces impedes the formation of a real hydrodynamically and thermodynamically created laminar gas flow. In the latter case a gas vapor mixture having a LEWIS' coefficient $\epsilon$ (i.e. the quotient of thermal diffusity to masss diffusity) above 1 would leave the cooling trap $\epsilon$ times supersaturated.

BRIEF DESCRIPTION OF THE DRAWING

The above and other objects, featues and advantages of the present invention will become more readily apparent from the following description, reference being made to the accompanying drawing in which.

SPECIFIC DESCRIPTION

Figure 1:
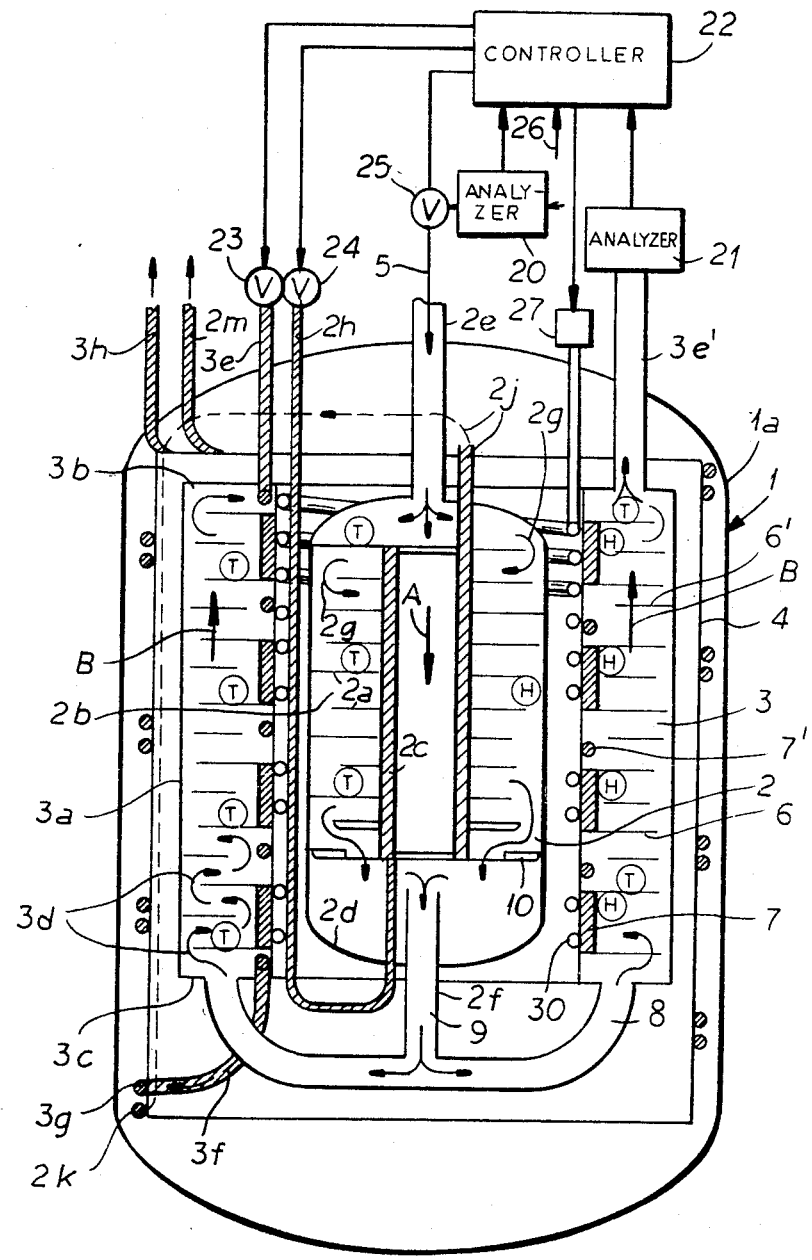
FIG. 1 is an axial cross-sectional view in highly diagrammatic form and with wall thicknesses omitted where they might be disproportionate showing a cooling trap according to the invention, e.g. for the recovery of xenon from nitrogen.

FIG. 1 shows a cold trap of a concentric design having a principal cooling stage 2 and a freezeout stage 3, the latter coaxially surrounding the former.

These two stages are surrounded by a waste gas cooled radiation shield 4 reducing losses from the cooling stages toward the housing 1a of the trap 1.

The precooling stage 2 is formed substantially from circular plates which are annular and may be spaced apart by vertical distances of 25 mm. From the annular plates circular arc segmental sections are cut to leave passages 2b between the plates 2a. These gaps can have a width which averages say 25 mm so that there is an overlap of each gap and plates above and below the plate formed with the gap of 25 mm.

The gaps are provided alternately on opposite sides of the tubular structure 2c on which the plates 2a are mounted.

Figure 2:
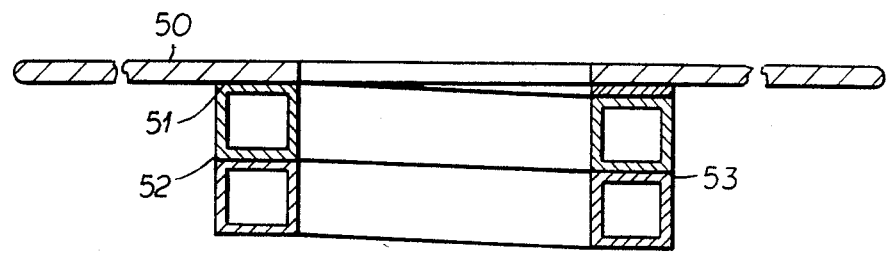
FIG. 2 is an axial section through a cooling plate according to the invention.

The assembly of plates 2a and the tubular structure 2c, which can be made up of a square-cross section tube wound in turns as will be seen from FIG. 2, is contained within a housing 2d to which the inlet pipe 2e and an outlet pipe 2f are connected at the upper and lower axial ends respectively.

The gas mixture from which a component X, e.g. xenon, is to be frozen out, is introduced through the inlet 2e as represented at 5. The arrows 2g show that this gas mixture passes in meandering pattern along the plates 2a from one side to the other as the gas flows in the general flow direction represented by the arrow A. The coolant through the member 2c cools the plates 2a which may be soldered to the member 2c.

From the outlet 2f as represented at 9, the gas mixture flows through the freezing zone generally indicated at 3, the piping 8 connecting the two zones being composed of low thermal conductivity material, e.g. the stainless steel.

In the freezing zone 3 the general flow direction is that represented by the arrows B. However, in the freezing zone 3, the annular plates 6 alternate with annular plate 6', the former constituting cooled surfaces. The plates 6 and 6' are carried by a cylindrical housing 3a which is closed at its ends 3b and 3c.

These plates 6 forming the cooling surfaces, are provided with coolant passages 7. Plates 6' form annular baffles and, since the plate 6' terminate outwardly of the cooling passages 7 and the plates 6 terminate inwardly of the housing wall 3a, a meandering flow of the gas mixture along the plates in the direction of arrows 3d is ensured as the gas moves from its lower inlet side to its upper outlet side where the gas mixture is discharged at 3e'.

The plates 6 are spaced apart by 50 mm vertically and are connected to the respective coolant passages 7 in pairs.

To clearly distinguish between the coolant and the gas, the coolant passages and ducts are shown in this diagrammatic view with shade lines.

The coolant is introduced for the precooling stage via a line 2h to the cooling passage 2c at the lower end of the latter and the spent coolant from this stage can be conducted as represented at 2j to coolant pipes 2k and circulating the shield 4 and in heat-conducting relationship therewith to additionally cool this shield.

Similarly, coolant is introduced via a line 3e to the freezeout stage passages 7 and 7' with the depleted coolant being fed at 3f to the turns 3g surrounding the shield 4. From these turns the coolant may be discharged as represented at 2m and 2h.

Consequently, as evidenced by the general flow directions A and B, in each stage, the gas mixture flows in a direction opposite the coolant, i.e. the cooling is effected as a counterflow or countercurrent cooling.

At the locations marked T, the temperature of the cooling surfaces is continuously monitored, e.g. by thermocouples.

The gas, before being admitted at 5 to the precooling stage can be passed through a chromatograph or other analyzer 20, an output of which is fed to a controller which receives a further output from a similar gas analyzer on the outlet pipe 3e, both gas analyzers feeding to the controller or computer 22, respective inputs representing the concentration of the gas component to be frozen out in the gas mixture. The analyzer 20 supplies the initial or starting concentration while the analyzer 21 supplies the final concentration. Analyzing of the output gas is not necessary as the final concentration is the saturation concentration of the removable component which corresponds to its vapor pressure at outlet temperature.

The controller 22 regulates the valves 23 and 24 regulating the coolant flow through the trap. A further output from the controller regulates a valve 25 controlling the gas flow through the trap and hence the residence time, while the thermocouples provide additional inputs to the controller 22 as represented at 26. Additional heating turns 30 can be provided within one or both of the stages and the flow of heating fluid to these turns can be regulated by the controller 22 via the heating fluid control 27.

Consequently, based upon the concentration of the gas component to be removed determined by the analyzer 20 to be present in the original mixture, the temperature at the inlet is held just at the saturation temperature for the particular component to be removed.

Based upon the output of the analyzer 21, which can be coupled with a setpoint controller, the computer 22 maintains the temperature at the outlet at the saturation temperature for the component to be removed at the desired concentration thereof in the output gas mixture.

The temperature monitoring also allows control via the heating and cooling passages of the temperatures of the surfaces successively encountered by the gas mixture so that a substantial linear drop in the temperature of the surfaces from the inlet to the outlet is ensured, the gas residence time being simultaneously controlled so that the gas temperature between the inlet and the outlet is always at its saturation temperature so that nucleation in the gas phase does not occur but the component is frozen out on the cooled surfaces.

The pipe section 7' between the cooling passages 7 which are composed of copper, may be composed of stainless steel, i.e. VA steel. Additional turns of heating passages may be provided at H as well.

In general deposited frozen out material will collect on the bottom of the housing 2d if any should occur in the upper cooling stage. To this end, shell-like cooling surfaces are provided at 10 at the gas downstream side of the precooling stage.

As can be seen from FIG. 2, wherever cooling plates are used in accordance with the invention, these plates, e.g. the plate 50, are soldered at 51 to a copper tube 52 here shown to form part of a helical coil in which a number of such turns are soldered together e.g. at 53. The tubes have a square cross section.

Figure 3:
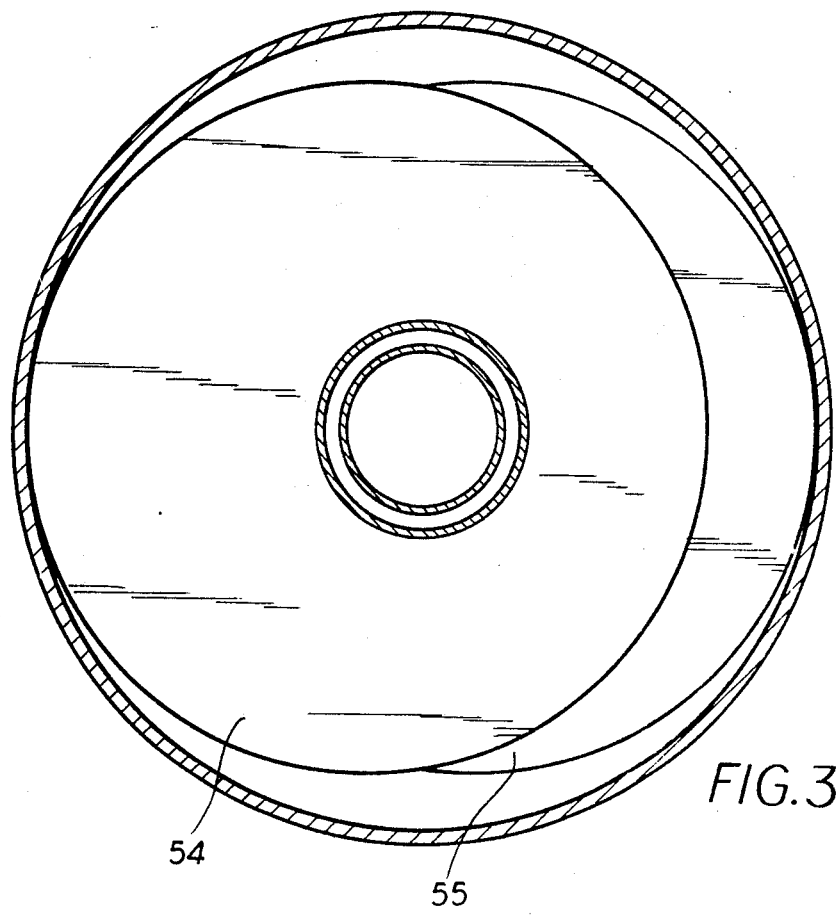
FIG. 3 is a section through the precooling stage of the apparatus of FIG. 1 illustrating one aspect of the plate arrangement.

From FIG. 3 it can be seen that instead of cutting segments from a plate to form the passages between them, alternating plates can be offset to opposite sides of the center as shown for the plates 54 and 55 in the construction of FIG. 3.

Figure 4:
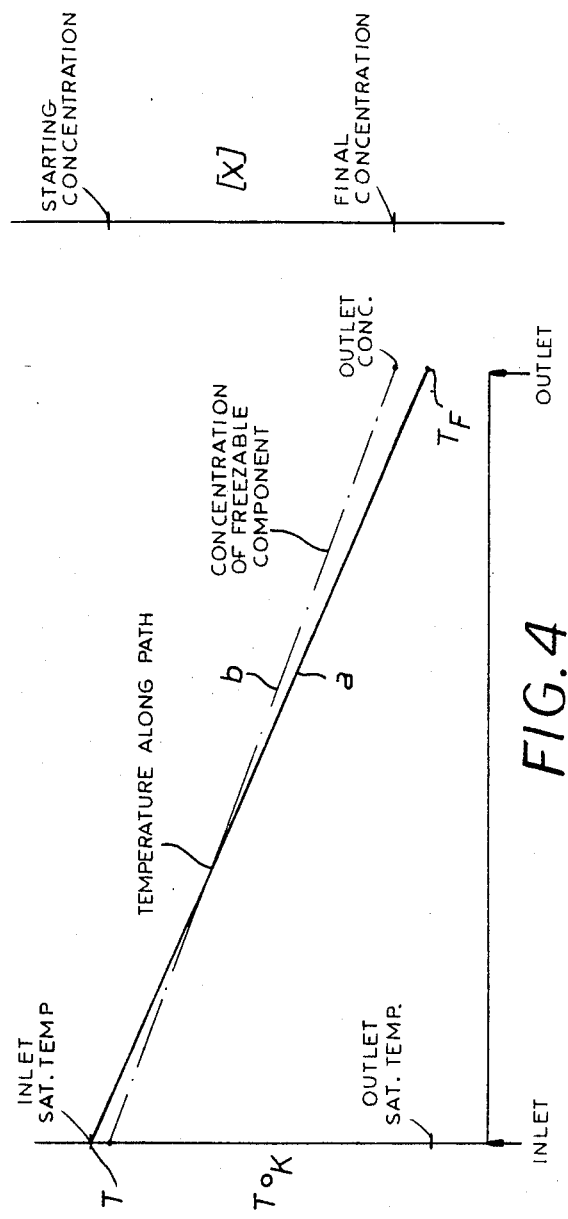
FIG. 4 is a graph in idealized form illustrating principles of the invention.

FIG. 4 is a graph in which the absolute temperature of the cooling surfaces and the concentration of the component X to be removed from the gas mixture are plotted along the ordinate while distance along the cooling surfaces is plotted along the abscissa. It can be seen that at the inlet, the temperature $T_1$ is equal to the saturation temperature for the component X at its starting concentration as measured by the analyzer 20. The outlet temperature $T_f$, however, is the saturation temperature for the final concentration of this component and is generally selected beforehand and is continuously monitored and controlled based upon the input of the analyzer 21. Between the inlet and outlet, the temperature generally falls linearly as represented by the curve a.

The corresponding concentration curve b has also been represented in this Figure.

The cold trap shown in the drawing can be used to freeze out xenon from nitrogen at 1 bar total pressure.

The starting concentration of xenon is between 1 and 2% by volume. In the precooling stage the gas mixture is cooled to about 120K while in the freezeout stretch the saturation temperature of the xenon depending on its concentration is maintained. At the outlet side of the freezeout stretch, the temperature can be between 110K and 78K depending upon the desired residual concentration of xenon.

Between the inlet and the outlet there is a proximal linear drop in the temperature. In this manner we have been able to reduce the residual concentration reliably by 2 to 3 orders of magnitude and to attain a purity of the carrier gas nitrogen of 99.998%.

Numerous tests have shown that the efficiency of the freezeout stretch is maintained for long periods since it is possible to obtain outflowing gases with a residual concentration of xenon determined precisely by the saturation pressure at the cooling surface temperature set at the outlet.

This is remarkable as in cooled passages slowly flown through by a xenon-containing gas mixture in a laminar flow a 2.2 times supersaturated xenon concentration in the gas leaving the passage would have been expected.

Tests with a mixture of 91 vol. % xenon and 9 vol. % argon have shown that even xenon as the carrier gas could be separated down to a residue of about 20 vpm and isolated in high purity, the argon admixture in the solid xenon amounting to about 20 vpm.

Figure 5:
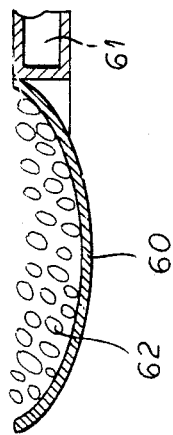
FIG. 5 is a detail view of a portion of another cooling surface according to the invention.

It has been found to be possible to improve the efficiency with which the gas component is frozen out by roughening the cooled surfaces, e.g. by coarse sandblasting, or by introducing into the two stages elements such as filler bodies or packings which increase the effective surface area. For example, proximal to the outlet cooling surfaces, we can provide troughs of sheetmetal filed with zeolite granules As can be seen from FIG. 5, a cooled plate 60 proximal to the outlet and associated with a coolant passage 61 may be somewhat trough-shaped so that it can be filled with a covering of an adsorbent or absorbent 62, preferably a zeolite, which is capable of selectively taking up the component to be removed from the gas mixture.

We claim:

1. A cooling trap for the removal of a gas component from a gas mixture, comprising:
    a housing having an inlet for said gas mixture, an outlet for said gas mixture, and means defining a gas flow path between said inlet and said outlet in a general flow direction;
    a multiplicity of staggered cooled and uncooled plates in said housing lying along said path and extending generally perpendicular to said flow direction, said plates being arranged such that said gas mixture flows in a meandering pattern across and around said plates from said inlet to said outlet over cooling surfaces formed by said cooled plates;
    at least one cooling coil in said housing adapted to be traversed by a cryogenic coolant for cooling said cooled plates, said cooling coil comprising:
        cooling sections with turns of coolant tubes of highly thermally conductive material in heat conducting relationship with respective groups of said cooled plates, and
        intermediate sections between said cooling sections formed by tubes of low thermal conductivity in turns bridging the turns of the tubes of highly thermally conductive material bridged by said intermediate section;
    a respective heating coil on each of said cooling sections for heating the plates thereof; and
    means for controlling coolant flow to said cooling coil and the heating effect of said heating coils to maintain
        an inlet temperature of said plates at which said plates are initially contacted by said gas mixture and proximal to said inlet equal to a saturation temperature of said component at a starting concentration thereof in said gas mixture,
        a temperature of said plates at said outlet substantially equal to the saturation temperature of a selected residual concentration of said component in said gas mixture, and
        a substantially linear temperature distribution along said plates between said inlet and said outlet.

2. The apparatus defined in claim 1 wherein said means for controlling coolant flow to said cooling coil and the heating effect of said heating coils includes individual temperature sensors on said plates.

3. The apparatus defined in claim 1 wherein said plates are constructed and arranged to accelerate flow of said gas mixture along said path at selected locations thereof.

4. The apparatus defined in claim 1, wherein said uncooled plates form baffles and are disposed between the cooled plates in said housing along said path.

5. The apparatus defined in claim 1 wherein said plates form a freezing stage in said housing and said plates are annular, said apparatus further comprising a precooling stage comprising additional cooled plates disposed in said housing coaxially within said freezing stage, said stages being connected in series and extending axially.

6. The apparatus defined in claim 5, further comprising means for increasing the effective surface areas of said plates.

7. The apparatus defined in claim 6 wherein said means for increasing the effective surface areas of said plates includes a solid structure adapted to selectively take up said component.

8. The apparatus defined in claim 7 wherein said solid structure is an adsorbent.

9. The apparatus defined in claim 8 wherein at least one of said cooling surfaces proximal to said inlet is covered with said adsorbent.

* * * * *